United States Patent
Izutani

(10) Patent No.: US 9,079,609 B2
(45) Date of Patent: Jul. 14, 2015

(54) HYDRAULIC POWER STEERING SYSTEM

(71) Applicant: JTEKT CORPORATION, Osaka-shi, Osaka (JP)

(72) Inventor: Keisuke Izutani, Yamatotakada (JP)

(73) Assignee: JTEKT CORPORATION, Osaka-shi (JP)

( * ) Notice: Subject to any disclaimer, the term of this patent is extended or adjusted under 35 U.S.C. 154(b) by 71 days.

(21) Appl. No.: 13/856,077

(22) Filed: Apr. 3, 2013

(65) Prior Publication Data

US 2013/0268161 A1    Oct. 10, 2013

(30) Foreign Application Priority Data

Apr. 10, 2012   (JP) ................. 2012-089380

(51) Int. Cl.
  *B62D 5/09* (2006.01)
  *B62D 5/065* (2006.01)
(52) U.S. Cl.
  CPC ............ *B62D 5/091* (2013.01); *B62D 5/065* (2013.01); *B62D 5/09* (2013.01)
(58) Field of Classification Search
  CPC ...... B62D 5/0463; B62D 5/008; B62D 5/065; B62D 5/09; B62D 5/091; B62D 6/002; B62D 6/003; B62D 7/159
  USPC ........................................ 701/41–42, 58, 60
  See application file for complete search history.

(56) References Cited

U.S. PATENT DOCUMENTS

| | | | | |
|---|---|---|---|---|
| 5,147,007 A * | 9/1992 | Kahrs et al. | ................... | 180/421 |
| 5,941,338 A * | 8/1999 | Miller et al. | ................... | 180/421 |
| 6,843,341 B2 * | 1/2005 | Grebe et al. | ................... | 180/422 |
| 6,879,118 B2 * | 4/2005 | Cao et al. | ........................ | 318/34 |
| 6,978,859 B2 * | 12/2005 | Torizawa | ...................... | 180/405 |
| 7,389,848 B2 * | 6/2008 | Palmberg et al. | ............. | 180/422 |
| 8,327,638 B2 * | 12/2012 | Ohtsukasa | ...................... | 60/445 |
| 2002/0166319 A1 * | 11/2002 | Grebe et al. | .................... | 60/327 |
| 2003/0024758 A1 * | 2/2003 | Fujita | ............................. | 180/422 |
| 2005/0049769 A1 * | 3/2005 | Tsuchiya | ........................ | 701/41 |
| 2005/0051377 A1 * | 3/2005 | Palmberg et al. | ............. | 180/421 |

(Continued)

FOREIGN PATENT DOCUMENTS

| | | |
|---|---|---|
| EP | 1659047 A1 | 5/2006 |
| JP | A-2006-306239 | 11/2006 |

OTHER PUBLICATIONS

Feb. 5, 2015 Extended European Search Report issued in European Patent Application No. 13162415.7.

*Primary Examiner* — Mary Cheung
*Assistant Examiner* — Atul Trivedi
(74) *Attorney, Agent, or Firm* — Oliff PLC

(57) ABSTRACT

A first valve opening degree correction value computation unit computes a correction value (first valve opening degree correction value) for the absolute value of a valve opening degree command value on the basis of a rotation speed deviation computed by a rotation speed deviation computation unit in a pump driving motor control unit. A second valve opening degree computation unit computes a correction value (second valve opening degree correction value) for the valve opening degree command value on the basis of the sign of the valve opening degree command value and the first valve opening degree correction value. A correction value addition unit adds the second valve opening degree correction value to the valve opening degree command value set by the valve opening degree command value setting unit.

2 Claims, 4 Drawing Sheets

(56) References Cited

U.S. PATENT DOCUMENTS

| | | |
|---|---|---|
| 2005/0061574 A1* | 3/2005 | Torizawa .................. 180/421 |
| 2006/0162988 A1* | 7/2006 | Ivantysynova et al. ....... 180/418 |
| 2006/0237256 A1* | 10/2006 | Sasaki et al. .............. 180/442 |
| 2010/0152971 A1* | 6/2010 | Shiino et al. ................ 701/41 |
| 2012/0097471 A1* | 4/2012 | Sakamaki et al. .......... 180/422 |
| 2012/0097472 A1* | 4/2012 | Kubo et al. ................ 180/422 |
| 2013/0037341 A1* | 2/2013 | Sakamaki .................. 180/422 |
| 2013/0138297 A1* | 5/2013 | Sakamaki .................... 701/41 |
| 2013/0161113 A1* | 6/2013 | Sakamaki et al. .......... 180/421 |
| 2013/0268161 A1* | 10/2013 | Izutani ........................ 701/42 |

* cited by examiner

HYDRAULIC POWER STEERING SYSTEM

INCORPORATION BY REFERENCE/RELATED APPLICATION

This application claims priority to Japanese Patent Application No. 2012-089380 filed on Apr. 10, 2012 the disclosure of which, including the specification, drawings and abstract, is incorporated herein by reference in its entirety.

BACKGROUND OF THE INVENTION

1. Field of the Invention

The invention relates to a hydraulic power steering system.

2. Discussion of Background

There is a conventional hydraulic power steering system that generates steering assist force by supplying hydraulic fluid from a hydraulic pump via a hydraulic control valve to a power cylinder coupled to a steering mechanism of a vehicle. In a common hydraulic power steering system, a hydraulic control valve is mechanically coupled to a steering member, such as a steering wheel, via a steering shaft, and the opening degree of the hydraulic control valve is adjusted on the basis of an operation of the steering member.

Japanese Patent Application Publication No. 2006-306239 (JP 2006-306239 A) describes a hydraulic power steering system that controls the opening degree of a hydraulic control valve with the use of an electric motor (valve driving motor) without mechanically coupling the hydraulic control valve to a steering member.

In the hydraulic power steering system in which the opening degree of the hydraulic control valve is controlled with the use of the valve driving motor, feedback control is executed on an electric motor (pump driving motor) for driving a hydraulic pump such that the rotation speed of the pump driving motor becomes a commanded pump rotation speed. However, the rotation speed of the pump driving motor may fluctuate due to fluctuations in load, or the like. For example, when a rotor of the hydraulic control valve is returned from an end position, at which hydraulic fluid supplied to one of cylinder chambers of a power cylinder becomes the maximum, toward a neutral position, the rotation speed of the pump driving motor fluctuates.

In this way, when the rotation speed of the pump driving motor fluctuates, steering assist force varies although the opening degree of the hydraulic control valve remains unchanged. Therefore, a steering feel may deteriorate.

SUMMARY OF THE INVENTION

The invention provides a hydraulic power steering system with which fluctuations in steering assist force due to fluctuations in the rotation speed of a pump driving motor are suppressed and a steering feel is improved.

According to a feature of an example of the invention, an opening degree command value set by opening degree command value setting means is corrected on the basis of a deviation between a rotation speed command value set by rotation speed command value setting means and a rotation speed of a pump driving motor, which is detected by rotation speed detection means, and a valve driving motor is controlled on the basis of the opening degree command value obtained through the correction. Thus, when the rotation speed of the pump driving motor fluctuates, it is possible to suppress fluctuations in steering assist force. Therefore, it is possible to improve a steering feel.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
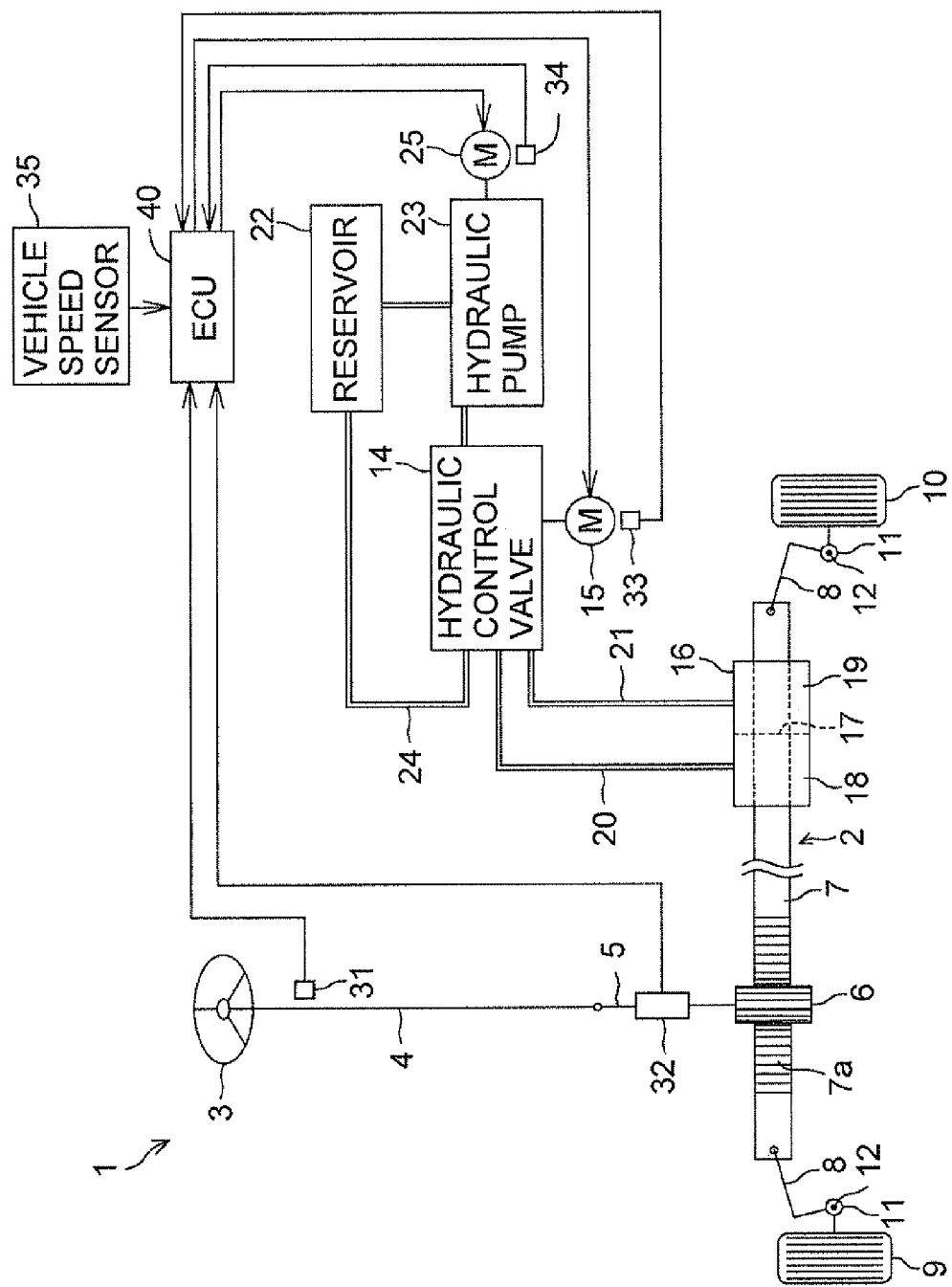
FIG. 1 is a schematic view that shows the schematic configuration of a hydraulic power steering system according to an embodiment of the invention.

FIG. 1 is a schematic view that shows the schematic configuration of a hydraulic power steering system 1 according to an embodiment of the invention. The hydraulic power steering system 1 is used to apply steering assist force to a steering mechanism 2 of a vehicle. The steering mechanism 2 includes a steering wheel 3, a steering shaft 4, a pinion shaft 5, and a rack shaft 7. The steering wheel 3 serves as a steering member, and is operated by a driver in order to steer the vehicle. The steering shaft 4 is coupled to the steering wheel 3. The pinion shaft 5 is coupled to the distal end portion of the steering shaft 4, and has a pinion gear 6. The rack shaft 7 has a rack 7a that is in mesh with the pinion gear 6, and serves as a steered shaft extending in the lateral direction of the vehicle.

Tie rods 8 are coupled to respective ends of the rack shaft 7. The tie rods 8 are coupled to knuckle arms 11 that support right and left steered wheels 9, 10, respectively. Each of the knuckle arms 11 is provided so as to be pivotable about a corresponding one of kingpins 12. When the steering wheel 3 is operated to rotate the steering shaft 4, the rotation of the steering shaft 4 is converted by the pinion gear 6 and the rack 7a into linear motion in the axial direction of the rack shaft 7. The linear motion is converted into rotational motion of each knuckle arm 11 about the corresponding kingpin 12. Thus, the right and left steered wheels 9, 10 are steered.

A steering angle sensor 31 is arranged around the steering shaft 4. The steering angle sensor 31 is used to detect a steering angle θh that is the rotation angle of the steering shaft 4. In the present embodiment, the steering angle sensor 31 is used to detect a rotation amount (rotation angle) of the steering shaft 4 in each of the forward and reverse directions from a neutral position of the steering shaft 4. The steering angle sensor 31 outputs an amount of rotation to the left from the neutral position as a positive value, and outputs an amount of rotation to the right from the neutral position as a negative value. The pinion shaft 5 is provided with a torque sensor 32 that is used to detect a steering torque Th.

The hydraulic power steering system 1 includes a hydraulic control valve 14, a power cylinder 16 and a hydraulic pump 23. The hydraulic control valve 14 is, for example, a rotary valve, and includes a rotor housing (not shown) and a rotor (not shown) that is used to change a direction in which hydraulic fluid flows. For example, a hydraulic control valve described in JP 2006-306239 A may be used as the hydraulic control valve 14. The opening degree of the hydraulic control valve 14 is controlled by rotating the rotor of the hydraulic control valve 14 with the use of an electric motor 15 (hereinafter, referred to as "valve driving motor 15"). The valve driving motor 15 is formed of, for example, a three-phase brushless motor. A rotation angle sensor 33 is arranged near the valve driving motor 15. The rotation angle sensor 33 is formed of, for example, a resolver, and is used to detect a rotation angle θB of the rotor of the valve driving motor 15.

The hydraulic control valve 14 is connected to the power cylinder 16 that applies steering assist force to the steering mechanism 2. The power cylinder 16 is coupled to the steering mechanism 2. Specifically, the power cylinder 16 has a piston 17 and a pair of cylinder chambers 18, 19. The piston 17 is formed integrally with the rack shaft 7. The cylinder chambers 18, 19 are defined by the piston 17. The cylinder chambers 18, 19 are connected to the hydraulic control valve 14 via a fluid passage 20 and a fluid passage 21, respectively.

The hydraulic control valve 14 is arranged at an intermediate part of a fluid circulation passage 24 that passes through a reservoir 22 and the hydraulic pump 23 that is used to generate steering assist force. The hydraulic pump 23 is formed of, for example, a gear pump. The hydraulic pump 23 is driven by an electric motor 25 (hereinafter, referred to as "pump driving motor 25") to draw the hydraulic fluid stored in the reservoir 22 and supply the hydraulic fluid to the hydraulic control valve 14. Excess hydraulic fluid is returned from the hydraulic control valve 14 to the reservoir 22 via the fluid circulation passage 24.

The pump driving motor 25 is used to drive the hydraulic pump 23. Specifically, the output shaft of the pump driving motor 25 is coupled to the input shaft of the hydraulic pump 23. When the output shaft of the pump driving motor 25 rotates, the input shaft of the hydraulic pump 23 rotates, and the hydraulic pump 23 is driven. The pump driving motor 25 is formed of a three-phase brushless motor. A rotation angle sensor 34 is arranged near the pump driving motor 25. The rotation angle sensor 34 is formed of, for example, a resolver and is used to detect a rotation angle θP of the rotor of the pump driving motor 25.

When the rotor of the hydraulic control valve 14 is rotated by the valve driving motor 15 in one direction from a reference rotation angular position (neutral position), the hydraulic control valve 14 supplies the hydraulic fluid to one of the cylinder chambers 18, 19 of the power cylinder 16 via a corresponding one of the fluid passages 20, 21, and returns the hydraulic fluid in the other one of the cylinder chambers 18, 19 to the reservoir 22. In addition, when the rotor of the hydraulic control valve 14 is rotated by the valve driving motor 15 in the other direction from the neutral position, the hydraulic control valve 14 supplies the hydraulic pressure to the other one of the cylinder chambers 18, 19 via the other one of the fluid passages 20, 21, and returns the hydraulic fluid in the one of the cylinder chambers 18, 19 to the reservoir 22.

When the rotor of the hydraulic control valve 14 is at the neutral position, the hydraulic control valve 14 keeps the pressures in the cylinder chambers 18, 19 of the power cylinder 16 equal to each other, and hydraulic fluid circulates through the fluid circulation passage 24. When the rotor of the hydraulic control valve 14 is rotated by the valve driving motor 15, the hydraulic fluid is supplied to one of the cylinder chambers 18, 19 of the power cylinder 16, and the piston 17 moves in the vehicle-width direction (the lateral direction of the vehicle). Thus, steering assist force acts on the rack shaft 7.

The valve driving motor 15 and the pump driving motor 25 are controlled by an electronic control unit (ECU) 40. A steering angle θh detected by the steering angle sensor 31, a steering torque Th detected by the torque sensor 32, a signal output from the rotation angle sensor 33, a signal output from the rotation angle sensor 34, a vehicle speed V detected by a vehicle speed sensor 35, a signal output from a current sensor 36 (see FIG. 2), and the like, are input into the ECU 40. The current sensor 36 is used to detect a current that flows through the valve driving motor 15.

Figure 2:
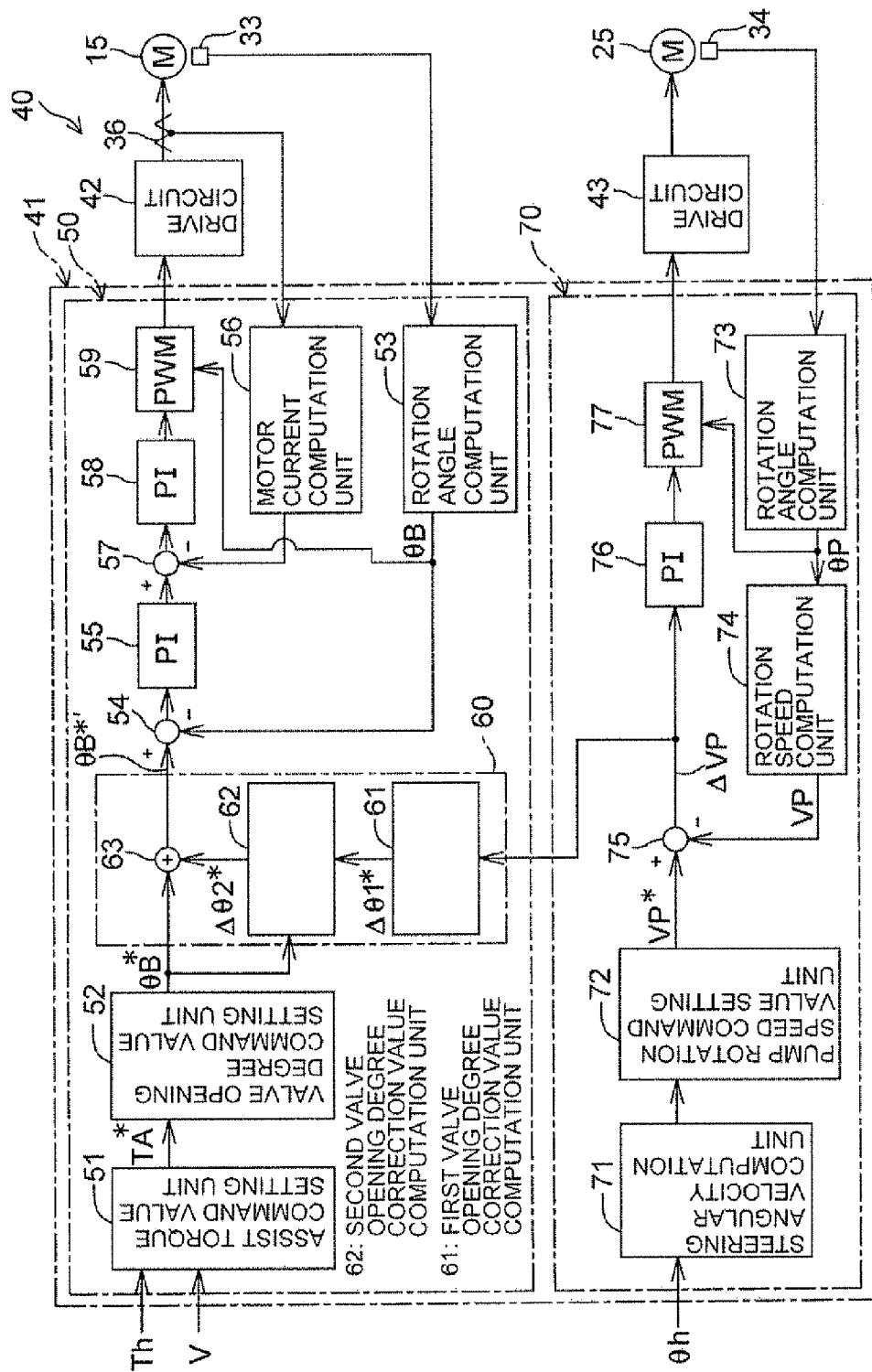
FIG. 2 is a block diagram that shows the electrical configuration of an ECU.

FIG. 2 is a block diagram that shows the electrical configuration of the ECU 40. The ECU 40 includes a microcomputer 41, a drive circuit (inverter circuit) 42 and a drive circuit (inverter circuit) 43. The drive circuit 42 is controlled by the microcomputer 41, and supplies electric power to the valve driving motor 15. The drive circuit 43 is controlled by the microcomputer 41, and supplies electric power to the pump driving motor 25. The current sensor 36 is provided on a power supply line that connects the drive circuit 42 to the valve driving motor 15.

The microcomputer 41 includes a CPU and memories (a ROM, a RAM, and the like), and executes predetermined programs to function as a plurality of functional processing units. The functional processing units include a valve driving motor control unit 50 that controls the valve driving motor 15 and a pump driving motor control unit 70 that controls the pump driving motor 25.

The pump driving motor control unit 70 includes a steering angular velocity computation unit 71, a pump rotation speed command value setting unit 82, a rotation angle computation unit 73, a rotation speed computation unit 74, a rotation speed deviation computation unit 75, a PI control unit 76 and a PWM control unit 77. The steering angular velocity computation unit 71 subjects a value output from the steering angle sensor 31 to temporal differentiation to compute a steering angular velocity. The pump rotation speed command value setting unit 72 sets a pump rotation speed command value (motor rotation speed command value) VP* that is a command value of the rotation speed (number of revolutions) of the hydraulic pump 23 (a command value of the rotation speed of the pump driving motor 25) on the basis of the steering angular velocity computed by the steering angular velocity computation unit 71.

Figure 3:
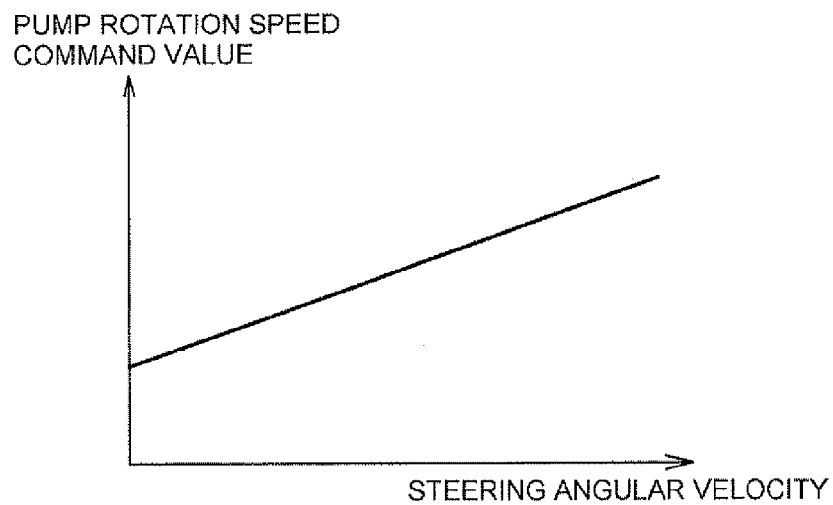
FIG. 3 is a graph that shows an example of a manner of setting a pump rotation speed command value with respect to a steering angular velocity.

Specifically, the pump rotation speed command value setting unit 72 sets a pump rotation speed command value VP* on the basis of a map that stores the correlation between the steering angular velocity and the pump rotation speed command value VP*. FIG. 3 is a graph that shows an example of a manner of setting the pump rotation speed command value VP* with respect to the steering angular velocity. The pump rotation speed command value VP* is set such that the pump rotation speed command value VP* takes a predetermined lower limit when the steering angular velocity is zero and the pump rotation speed command value VP* monotonously increases with an increase in the steering angular velocity.

The rotation angle computation unit 73 computes a rotation angle θP of the pump driving motor 25 on the basis of a signal output from the rotation angle sensor 34. The rotation speed computation unit 74 computes a rotation speed (number of revolutions) VP of the pump driving motor 25 on the basis of the rotation angle θP of the pump driving motor 25, which is computed by the rotation angle computation unit 73. The rotation speed deviation computation unit 75 computes a deviation ΔVP (=VP*−VP) between the pump rotation speed command value VP* set by the pump rotation speed command value setting unit 72 and the rotation speed VP of the pump driving motor 25, which is computed by the rotation speed computation unit 74.

The PI control unit 76 carries out PI computation on the rotation speed deviation ΔVP computed by the rotation speed deviation computation unit 75. That is, the rotation speed deviation computation unit 75 and the PI control unit 76 constitute rotation speed feedback control means for bringing the rotation speed VP of the pump driving motor 25 to the pump rotation speed command value VP*. The PI control unit 76 carries out PI computation on the rotation speed deviation ΔVP to thereby compute a control voltage value that is a value of control voltage that should be applied to the pump driving motor 25.

The PWM control unit 77 generates a drive signal on the basis of the control voltage value computed by the PI control unit 76 and the rotation angle OP of the pump driving motor 25, which is computed by the rotation angle computation unit 73, and supplies the drive signal to the drive circuit 43. Thus, a voltage corresponding to the control voltage value computed by the PI control unit 76 is applied from the drive circuit 43 to the pump driving motor 25.

The valve driving motor control unit 50 includes an assist torque command value setting unit 51, a valve opening degree command value setting unit 52, a valve opening degree command value correction unit 60, a rotation angle computation unit 53, a rotation angular deviation computation unit 54, a proportional-integral (PI) control unit 55, a motor current computation unit 56, a current deviation computation unit 57, a PI control unit 58 and a pulse width modulation (PWM) control unit 59.

Figure 4:
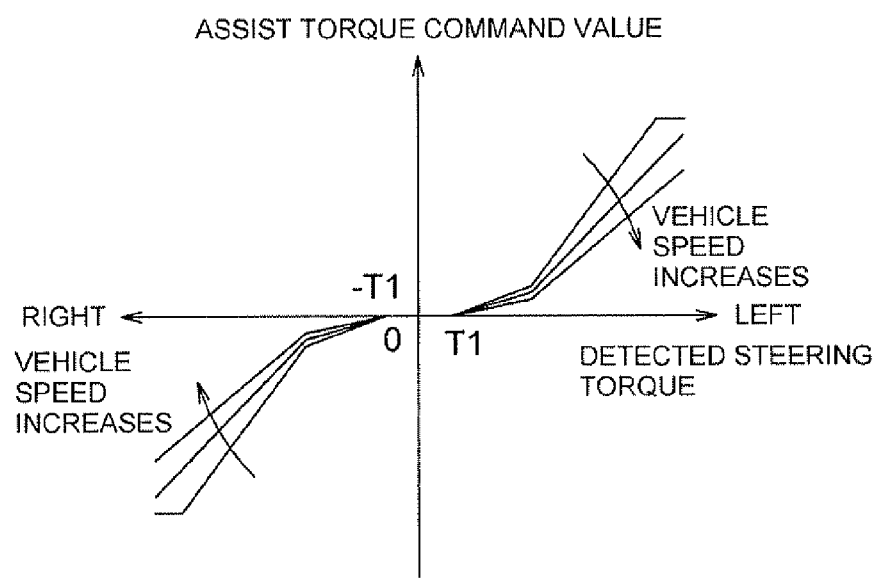
FIG. 4 is a graph that shows an example of a manner of setting an assist torque command value with respect to a detected steering torque.

The assist torque command value setting unit 51 sets an assist torque command value TA* on the basis of a detected steering torque Th detected by the torque sensor 32 and a vehicle speed V detected by the vehicle speed sensor 35. The assist torque command value TA* is a command value of assist torque that should be generated by the power cylinder 16. Specifically, the assist torque command value setting unit 51 sets an assist torque command value TA* on the basis of a map that stores the correlation for each vehicle speed, between the detected steering torque and the assist torque command value. FIG. 4 is a graph that shows an example of a manner of setting the assist torque command value with respect to the detected steering torque.

The detected steering torque Th is expressed, for example, such that torque for steering to the left takes a positive value and torque for steering to the right takes a negative value. In addition, the assist torque command value TA* takes a positive value when assist torque for steering to the left is generated by the power cylinder 16, and takes a negative value when assist torque for steering to the right is generated by the power cylinder 16.

The assist torque command value TA* with respect to a positive value of the detected steering torque Th takes a positive value, and the assist torque command value TA* with respect to a negative value of the detected steering torque Th takes a negative value. When the detected steering torque Th is a small value that falls within the range of −T1 to T1, the assist torque command value TA* is set to zero. When the detected steering torque Th falls outside the range of −T1 to T1, the assist torque command value TA* is set such that the absolute value of the assist torque command value TA* increases as the absolute value of the detected steering torque Th increases. In addition, the assist torque command value TA* is set such that the absolute value of the assist torque command value TA* decreases as the vehicle speed V detected by the vehicle speed sensor 35 increases. The assist torque command value TA* set by the assist torque command value setting unit 51 is transmitted to the valve opening degree command value setting unit 52.

The valve opening degree command value setting unit 52 sets a valve opening degree command value (motor rotation angle command value) θB* on the basis of the assist torque command value TA* set by the assist torque command value setting unit 51. The valve opening degree command value θB* is a command value of the opening degree of the hydraulic control valve 14 (command value of the rotation angle of the valve driving motor 15). In the present embodiment, the rotation angle of the valve driving motor 15 at the time when the rotor of the hydraulic control valve 14 is at the neutral position is zero degrees. Then, when the rotation angle of the valve driving motor 15 is larger than zero degrees, the opening degree of the hydraulic control valve 14 is controlled such that assist torque for steering to the left is generated by the power cylinder 16. On the other hand, when the rotation angle of the valve driving motor 15 is smaller than zero degrees, the opening degree of the hydraulic control valve 14 is controlled such that assist torque for steering to the right is generated by the power cylinder 16. Note that, as the absolute value of the rotation angle of the valve driving motor 15 increases, the absolute value of assist torque generated by the power cylinder 16 increases.

Figure 5:
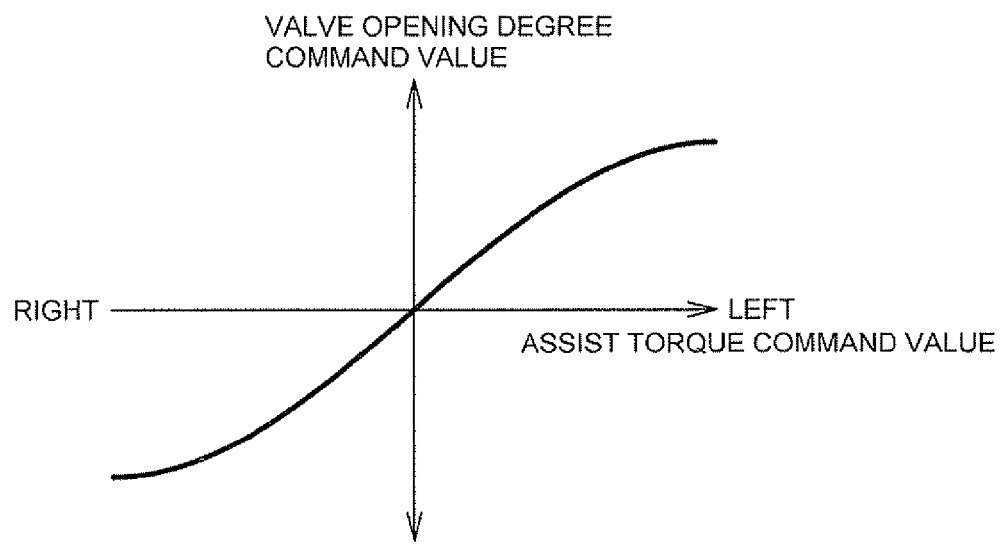
FIG. 5 is a graph that shows an example of a manner of setting a valve opening degree command value with respect to an assist torque command value.

The valve opening degree command value setting unit 52 sets the valve opening degree command value θB* on the basis of a map that stores the correlation between the assist torque command value TA* and the valve opening degree command value θB*. FIG. 5 is a graph that shows an example of a manner of setting the valve opening degree command value θB* with respect to the assist torque command value TA*. The valve opening degree command value θB* with respect to a positive value of the assist torque command value TA* takes a positive value, and the valve opening degree command value θB* with respect to a negative value of the assist torque command value TA* takes a negative value. The valve opening degree command value θB* is set such that the absolute value of the valve opening degree command value θB* increases as the absolute value of the assist torque command value TA* increases. The valve opening degree command value θB* set by the valve opening degree command value setting unit 52 is transmitted to the valve opening degree command value correction unit 60.

The valve opening degree command value correction unit 60 corrects the valve opening degree command value θB*, which is set by the valve opening degree command value setting unit 52, on the basis of the rotation speed deviation ΔVP (=VP*−VP) computed by the rotation speed deviation computation unit 75 in the pump driving motor control unit 70. The valve opening degree command value θB*' obtained through correction by the valve opening degree command value correction unit 60 is transmitted to the rotation angular deviation computation unit 54. The details of the valve opening degree command value correction unit 60 will be described later.

The rotation angle computation unit 53 computes the rotation angle θB of the valve driving motor 15 on the basis of a signal output from the rotation angle sensor 33. The rotation angle θB computed by the rotation angle computation unit 53 is transmitted to the rotation angular deviation computation unit 54. The rotation angular deviation computation unit 54 computes a deviation ΔθB (=θB*'−θB) between the valve opening degree command value θB*', which is obtained through correction by the valve opening degree command value correction unit 60, and the rotation angle θB of the valve driving motor 15, which is computed by the rotation angle computation unit 53.

The PI control unit 55 carries out PI computation on the rotation angular deviation ΔθB computed by the rotation angular deviation computation unit 54. That is, the rotation angular deviation computation unit 54 and the PI control unit 55 constitute rotation angle feedback control means for bringing the rotation angle θB of the valve driving motor 15 to the corrected valve opening degree command value θB*'. The PI control unit 55 computes a current command value for the valve driving motor 15 by carrying out PI computation on the rotation angular deviation ΔθB.

The motor current computation unit 56 detects a motor current that flows through the valve driving motor 15 on the basis of a signal output from the current sensor 36. The current deviation computation unit 57 computes a deviation between the current command value obtained by the PI control unit 55 and the motor current computed by the motor current computation unit 56. The PI control unit 58 carries out PI computation on the current deviation computed by the current deviation computation unit 57. That is, the current deviation computation unit 57 and the PI control unit 58 constitute current feedback control means for bringing the motor current that flows through the valve driving motor 15 to the current command value. The PI control unit 58 computes a control voltage value that is a value of control voltage that should be applied to the valve driving motor 15 by carrying out PI computation on the current deviation.

The PWM control unit 59 generates a drive signal on the basis of the control voltage value computed by the PI control unit 58 and the rotation angle θB of the valve driving motor 15, which is computed by the rotation angle computation unit 53, and supplies the drive signal to the drive circuit 42. Thus, a voltage corresponding to the control voltage value computed by the PI control unit 58 is applied from the drive circuit 42 to the valve driving motor 15.

Figure 6:
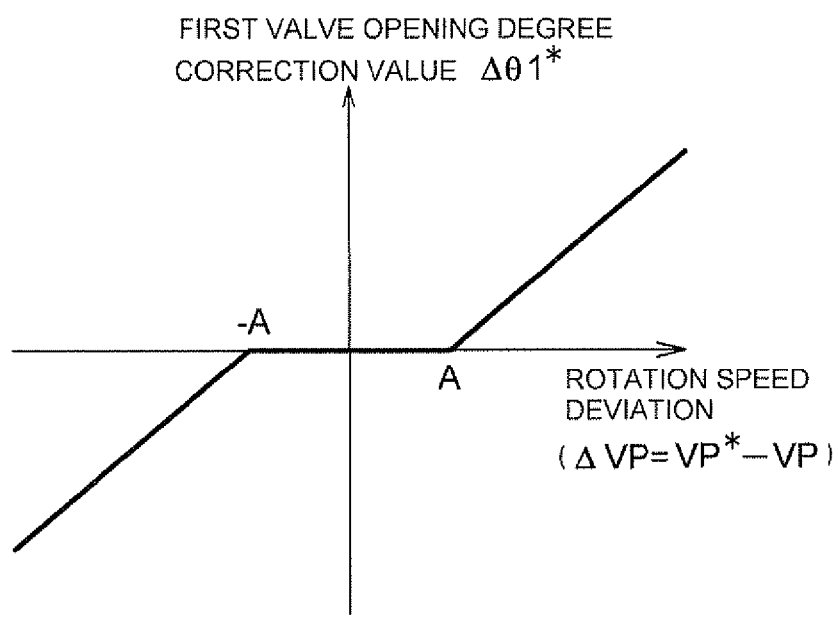
FIG. 6 is a graph that shows an example of a manner of setting a first valve opening degree correction value with respect to a rotation speed deviation.

The valve opening degree command value correction unit 60 will be described in detail. The valve opening degree command value correction unit 60 includes a first valve opening degree correction value computation unit 61, a second valve opening degree correction value computation unit 62 and a correction value addition unit 63. The first valve opening degree correction value computation unit 61 computes a correction value (hereinafter, referred to as "first valve opening degree correction value Δθ1*") for the absolute value |θB*| of the valve opening degree command value θB* on the basis of the rotation speed deviation ΔVP (=VP*−VP) computed by the rotation speed deviation computation unit 75 in the pump driving motor control unit 70. The first valve opening degree correction value computation unit 61 computes the first valve opening degree correction value Δθ1* on the basis of for example, a map that stores the correlation between the rotation speed deviation ΔVP and the first valve opening degree correction value Δθ1*. FIG. 6 is a graph that shows an example of a manner of setting the first valve opening degree correction value Δθ1* with respect to the rotation speed deviation ΔVP.

When the rotation speed deviation ΔVP is a value close to zero within the range from −A (A>0) to A, the first valve opening degree correction value Δθ1* is fixed to zero. In a range in which the rotation speed deviation ΔVP is larger than the predetermined value A, the first valve opening degree correction value Δθ1* is set so as to monotonously increase (linearly in the example of FIG. 6) from zero with an increase in the rotation speed deviation ΔVP. That is, when the pump rotation speed command value VP* is larger than the rotation speed VP of the pump driving motor 25 and the deviation ΔVP (=VP*−VP) is larger than the predetermined value A, the first valve opening degree correction value Δθ1* takes a positive value, and the first valve opening degree correction value Δθ1* increases as the rotation speed deviation ΔVP increases. In the range in which the rotation speed deviation ΔVP is larger than the predetermined value A, the first valve opening degree correction value Δθ1* may be set so as to nonlinearly increase with an increase in the rotation speed deviation ΔVP.

On the other hand, in a range in which the rotation speed deviation ΔVP is smaller than the predetermined value −A, the first valve opening degree correction value Δθ1* is set so as to monotonously (linearly in the example shown in FIG. 6) decrease from zero with a decrease in the rotation speed deviation ΔVP. That is, when the pump rotation speed command value VP* is lower than the rotation speed VP of the pump driving motor 25 and the deviation ΔVP (=VP*−VP) is smaller than the predetermined value −A, the first valve opening degree correction value Δθ1* takes a negative value, and the first valve opening degree correction value Δθ1* decreases as the rotation speed deviation ΔVP decreases. In the region in which the rotation speed deviation ΔVP is smaller than the predetermined value −A, the first valve opening degree correction value Δθ1* may be set so as to nonlinearly decrease with a decrease in the rotation speed deviation ΔVP. The first valve opening degree correction value Δθ1* computed by the first valve opening degree correction value computation unit 61 is transmitted to a second valve opening degree correction value computation unit 62.

The second valve opening degree correction value computation unit 62 computes a correction value (hereinafter, referred to as "second valve opening degree correction value Δθ2*") for the valve opening degree command value θB* on the basis of the sign of the valve opening degree command value θB* set by the valve opening degree command value setting unit 52 and the first valve opening degree correction value Δθ1* computed by the first valve opening degree correction value computation unit 61. Specifically, when the valve opening degree command value θB* set by the valve opening degree command value setting unit 52 is larger than or equal to zero (zero or a positive value), the second valve opening degree correction value computation unit 62 computes the first valve opening degree correction value Δθ1*, which is computed by the first valve opening degree correction value computation unit 61, as it is, as the second valve opening degree correction value Δθ2*. Then, the second valve opening degree correction value computation unit 62 transmits the computed second valve opening degree correction value Δθ2* to the correction value addition unit 63.

On the other hand, when the valve opening degree command value θB* set by the valve opening degree command value setting unit 52 is a negative value, the second valve opening degree correction value computation unit 62 computes a value (−Δθ1*), which is obtained by inverting the sign of the first valve opening degree correction value Δθ1* computed by the first valve opening degree correction value computation unit 61, as the second valve opening degree correction value Δθ2*. Then, the second valve opening degree correction value computation unit 62 transmits the computed second valve opening degree correction value Δθ2* to the correction value addition unit 63.

The correction value addition unit 63 adds the second valve opening degree correction value Δθ2*, which is transmitted from the second valve opening degree correction value computation unit 62, to the valve opening degree command value θB* set by the valve opening degree command value setting unit 52. The steering assist force (assist torque) that is generated by the power cylinder 16 varies on the basis of the rotation speed (number of revolutions) of the pump driving motor 25 and the valve opening area (valve opening degree) of the hydraulic control valve 14. Specifically, the steering assist force increases as the rotation speed of the pump driving motor 25 increases and as the valve opening area of the hydraulic control valve 14 increases. When the rotation speed VP of the pump driving motor 25 fluctuates due to fluctuations in load, or the like, and the rotation speed VP of the pump driving motor 25 becomes lower than the pump rotation speed command value VP*, the steering assist force tends to fluctuate so as to be decreased.

In such a case, the valve opening degree command value correction unit 60 corrects the valve opening degree command value θB* such that the absolute value of the valve opening degree command value θB* set by the valve opening degree command value setting unit 52 increases. Specifically, when the valve opening degree command value θB* is a positive value (a command value for generating assist torque for steering to the left), the second valve opening degree correction value Δθ2* that is added to the valve opening degree command value θB* becomes a positive value. When the valve opening degree command value θB* is a negative value (a command value for generating assist torque for steering to the right), the second valve opening degree correction value Δθ2* that is added to the valve opening degree command value θB* becomes a negative value.

At this time, the valve opening degree command value θB* is corrected such that the absolute value of the valve opening degree command value θB* increases as the deviation ΔVP (=VP*−VP) between the pump rotation speed command value VP* and the rotation speed VP of the pump driving motor 25 increases. That is, the valve opening degree command value θB* is corrected such that the steering assist force increases. Thus, it is possible to suppress fluctuations in steering assist force. Therefore, it is possible to improve a steering feel.

On the other hand, when the rotation speed VP of the pump driving motor 25 fluctuates due to fluctuations in load, or the like, and the rotation speed VP of the pump driving motor 25 becomes higher than the pump rotation speed command value VP*, the steering assist force tends to fluctuate so as to be increased. In such a case, the valve opening degree command value correction unit 60 corrects the valve opening degree command value θB* such that the absolute value of the valve opening degree command value θB* set by the valve opening degree command value setting unit 52 decreases. Specifically, when the valve opening degree command value θB* is a positive value (a command value for generating assist torque for steering to the left), the second valve opening degree correction value Δθ2* that is added to the valve opening degree command value θB* becomes a negative value. When the valve opening degree command value θB* is a negative value (a command value for generating assist torque for steering to the right), the second valve opening degree correction value Δθ2* that is added to the valve opening degree command value θB* becomes a positive value.

At this time, the valve opening degree command value θB* is corrected such that the absolute value of the valve opening degree command value θB* decreases as the deviation ΔVP (=(VP*−VP)<0) between the pump rotation speed command value VP* and the rotation speed VP of the pump driving motor 25 decreases. That is, the valve opening degree command value θB* is corrected such that the steering assist force reduces. Thus, it is possible to suppress fluctuations in steering assist force. Therefore, it is possible to improve a steering feel.

The embodiment of the invention is described above. However, the invention may be implemented in various other embodiments. For example, in the above-described embodiment, the first valve opening degree correction value computation unit 61 computes the first valve opening degree correction value Δθ1* on the basis of the map that stores the correlation between the rotation speed deviation ΔVP and the first valve opening degree correction value Δθ1*. Alternatively, the first valve opening degree correction value computation unit 61 may compute the first valve opening degree correction value Δθ1* from the rotation speed deviation ΔVP on the basis of a predetermined arithmetic expression.

Other than the above, various modifications may be made within the scope of the invention.

What is claimed is:

1. A hydraulic power steering system that generates a steering assist force by supplying hydraulic fluid from a hydraulic pump to a power cylinder, which is coupled to a steering mechanism of a vehicle, via a hydraulic control valve that is not mechanically coupled to a steering member, comprising:
   a pump driving motor that is used to drive the hydraulic pump;
   a valve driving motor that is used to control an opening degree of the hydraulic control valve;
   a rotation speed detection sensor for detecting a rotation speed of the pump driving motor;
   a rotation speed command value setting controller for setting a rotation speed command value that is a command value of the rotation speed of the pump driving motor;
   a pump driving motor drive controller for executing drive control on the pump driving motor such that the rotation speed detected by the rotation speed detection sensor is equal to the rotation speed command value set by the rotation speed command value setting controller;
   an opening degree command value setting controller for setting an opening degree command value that is a command value of the opening degree of the hydraulic control valve;
   an opening degree command value correction controller for correcting the opening degree command value, which is set by the opening degree command value setting controller, on the basis of a deviation between the rotation speed command value set by the rotation speed command value setting controller and the rotation speed detected by the rotation speed detection sensor; and
   a valve driving motor drive controller for executing drive control on the valve driving motor on the basis of the opening degree command value obtained through correction by the opening degree command value correction controller.

2. The hydraulic power steering system according to claim 1, wherein
   the opening degree command value correction controller includes:
   opening degree command value correction controller for correcting the opening degree command value set by the opening degree command value setting controller such that the steering assist force increases when the rotation speed detected by the rotation speed detection sensor is lower than the rotation speed command value set by the rotation speed command value setting controller; and
   opening degree command value correction controller for correcting the opening degree command value set by the opening degree command value setting controller such that the steering assist force decreases when the rotation speed detected by the rotation speed detection sensor is higher than the rotation speed command value set by the rotation speed command value setting controller.

\* \* \* \* \*